United States Patent [19]

Heisler

[11] Patent Number: 4,540,325
[45] Date of Patent: Sep. 10, 1985

[54] UPSTACKER APPARATUS WITH BIASED GRIPPING MEANS

[76] Inventor: Raymond A. Heisler, 657 Dakota Trail, Franklin Lakes, N.J. 07417

[21] Appl. No.: 485,743

[22] Filed: Apr. 18, 1983

[51] Int. Cl.³ .............................................. B65G 57/30
[52] U.S. Cl. ......................................... 414/96; 414/35
[58] Field of Search .................... 414/35, 36, 59, 95, 414/96; 53/541

[56] References Cited

U.S. PATENT DOCUMENTS 4,354,786 10/1982 Spitler ................................... 414/46

FOREIGN PATENT DOCUMENTS 100841 11/1962 Norway .............................. 414/96

*Primary Examiner*—Robert J. Spar
*Assistant Examiner*—Janice Krizek
*Attorney, Agent, or Firm*—Ralph R. Roberts

[57] ABSTRACT

An upstacker jaw clamp and palletizer apparatus in which containers are fed one at a time to an upstacker station and an elevating platform whereat these containers are lifted and at the extreme lift are retained by opposed jaw clamps. These jaw clamps are moved substantially simultaneously to and from retaining condition in response to electronic control signals. The jaw clamps carry pins that are reciprocably retained in bores with forward movement provided by a bias. When a round metal container is palletized, each jaw clamp has two substantially alike pins with blunted forward ends. When the container is plastic with a contoured bottom, the pins are threaded and retain a contoured member. No matter the container shape, the jaw, when moved forwardly, causes the lip portion to move under the elevated container with the pin ends, the contoured member, or the plate disposed immediately above the lip portion and biased forwardly to engage the side walls of the container. The jaws, when moved outwardly for upstacking the immediately-below container, utilize the forwardly-biased pins which continue to engage the side walls of the container as the lip portion is withdrawn. The ends of the biased pins and contoured member provide a centering action. Further withdrawal of the jaw clamp enables the immediately-below container to be moved into position with inertia employed to minimize the drop of the above container during upstacking.

27 Claims, 16 Drawing Figures

UPSTACKER APPARATUS WITH BIASED GRIPPING MEANS

BACKGROUND OF THE INVENTION

This invention is found in the general art of palletizing and more particularly in upstacker apparatus in which jaw means is used to grip the containers to be first stacked and then transferred in arrayed rows to a pallet.

DESCRIPTION OF THE PRIOR ART

Palletizing has been and is used to arrange and pack for shipment like articles such as paint cans. Cartons are also stacked and arranged on a pallet for shipping to a warehouse or customer. Where and when the containers are used to contain fluids such as paint, the current methods of stacking and palletizing often leave much to be desired especially when the containers have labels affixed to their sides. Accumulations in stacks and positioning on a transfer plate is known and shown in several patents and in apparatus known in the trade. Upstacking has been used with spring-actuated arms canted upwardly and inwardly and are generally used with box-like containers. Upstacking, when and where used prior to this invention, does not employ a reciprocated supporting lip that is withdrawn prior to a complete disengagement of the clamp jaws. The inertia of the container to the drop or fall is used by Applicant to insure a centering and lifting motion to the container.

A careful pre-Ex search was made in the art and of note is U.S. Pat. No. 3,506,109 which issued to Braas on Apr. 14, 1970 which depicts clamp rails which arrest the advance of articles and the lift a grasped article and allows the article to fall freely on top of the continuously advanced following article. SALWASSER, U.S. Pat. No. 3,570,209 as issued Mar. 16, 1971 shows elevating a plurality of articles in a horizontally extending row and with a repeat of the elevating step until a row of stacks is formed. The row of stacks is then shifted laterally to an offset position with the rows positioned as a unit. GOLDFARB et al U.S. Pat. No. 3,751,849 as issued Aug. 14, 1973 discloses a toy which stacks articles using a clamp composed of pivoted arms. KEMPER, U.S. Pat. No. 3,858,732 as issued Jan. 7, 1975 shows a stacking clamp in FIG. 6 thereof. As far as is known, Applicant's jaw clamps employing spring-biased pins to center the container during withdrawal of the supporting lip portion is novel and this unique clamp is not shown or suggested by and in the known art.

SUMMARY OF THE INVENTION

This invention may be summarized, at least in part, with reference to its objects. It is an object of this invention to provide, and it does provide, reciprocable jaw clamps movable into gripping and supporting condition in a timed relationship with an upstacking apparatus. These clamps have spring-biased pins carried by the jaw apparatus and movable to and into a centering condition with the bottom sides of the container during withdrawal of the clamp. This cycled clamp utilizes the inertia of the above container to minimize the drop during the bringing upward of a beneath container.

It is a further object of this invention to provide, and it does provide, an opposed pair of reciprocable clamp assemblies each with a pair of spring-biased pins independently movable in guideways in the block portion of the clamp assembly and movable to provide a centering position and maintain the container in said position during withdrawal of the supporting lips of the jaw. The upstacker moves the next below container into supporting position and then lifts said container to a delivery position. The upstacker and biased pins utilize the inertia of the filled container which drops a minimal amount during the upstack motion.

The upstacker apparatus of this invention delivers pallets from a storage chute to a position just below and ahead or forwardly of a dead plate. This dead plate is disposed to receive stacks of containers arranged in vertical array. These containers are delivered to the dead plate in an aligned pattern and relationship. Each clamp assembly is moved by a pneumatic cylinder and uses switches to send signals to a counting circuit which determines the amount of containers in a stack and the number of stacks in a row. These rows are aligned on the dead plate before transferring to the pallet. If intermeshing is desired there is provided switching means to alter the delivery stroke from the upstacker to the dead plate to provide a half stroke position.

The jaw clamp includes a reciprocated block which includes an integral or secured lip member disposed to engage and support the weight of a filled container preparatory to the bringing of yet another container from a receiving condition and raise this container so as to engage, support and move this container and the above container to the delivery position. Each jaw preferably has two spring-biased pins carried in parallel bores formed in the block. These pins are precisely controlled in their back and forth motion. The pins, when the container is made with substantial side walls not subject to damage, are independently movable and have their front ends rounded. When the container is less substantial or is contoured the pins may be yoked together with a contoured end member carried by the front end of these pins. When the container is a box-like member of square or rectangular shape the pins may be yoked and have a plate at their forward end.

The clamp jaw assembly is reciprocated in a timed relationship as controlled by a timing circuit. The pins in the block are designed to project toward the container and contact said container when and while the supporting lip is withdrawn from under the supported container. During this withdrawal the below container is being lifted to engage and support the immediately above container. Shortly before the below container arrives the above container is disengaged from the clamp assembly and the spring-biased pins. The inertia of the supported above container in the removal or discontinuance of contact with the container enables the upward movement of the elevated below container to mate with and lift the above container. The pins with or without end attachment provide a centering capability of the jaws and the container. The embodiments shown and described contemplate plural pins and spring-bias means but other arrangements are contemplated and may be provided.

The novel clamp assembly apparatus to be hereinafter described in detail employs spring-actuated pins either as individual members acting in pairs or as yoked members adapted to grip the opposed sides of a container which may be of metal, plastic or a box-like member to insure and assure alignment and centering initially during stacking and at the conclusion of stacking. The transfer of the lower to the above elevated position utilizes the inertia of the elevated container during the withdrawal of the supporting lip portion of the clamp. The transfer of the stacked containers to and from the dead plate by a reciprocated vertical retaining and guide means onto a pallet is made in accordance with a program provided by a timed control circuit.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen specific embodiments of upstacker means employing jaw clamps for containers to be stacked, transferred and palletized as adopted for use in palleting apparatus, and showing preferred means for the construction and operation of spring-biased pins carried in a reciprocated manner. This specific embodiment has been chosen for the purposes of illustration and description as shown in the accompanying drawings wherein:

BRIEF DESCRIPTION OF THE DRAWINGS

In the following description and in the claims various details are identified by specific names for convenience. These names are intended to be generic in their application. Corresponding characters refer to like members throughout the several figures of the drawings.

EMBODIMENT OF FIG. 1

Figure 1:
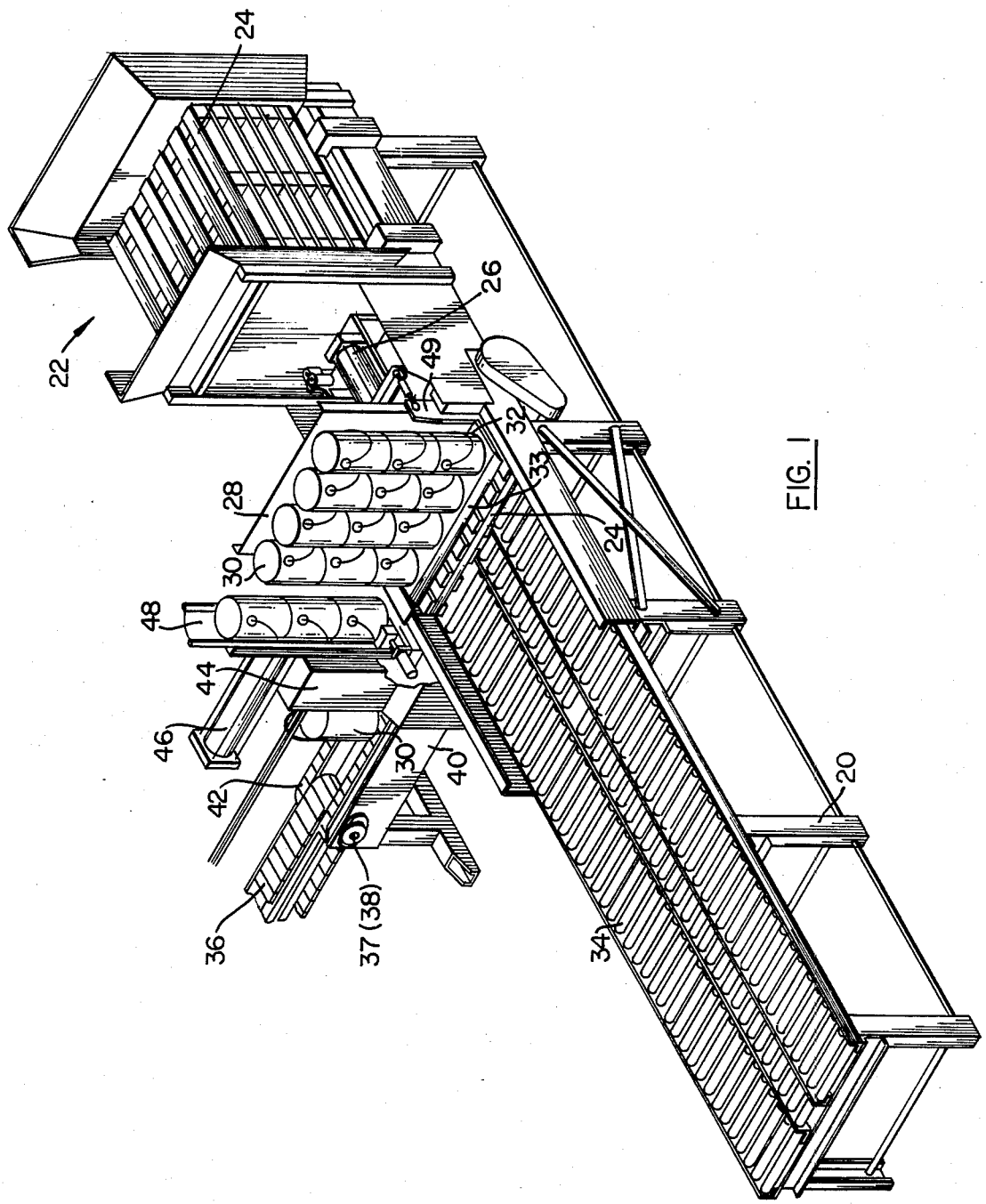
FIG. 1 represents an isometric view, partly diagrammatic and showing the palletizer as used to position cylindrical containers on a pallet as delivered from a storage chute.

In FIG. 1 there is illustrated the palletizing apparatus of this invention. As shown, this apparatus has a frame generally identified as 20 which includes a hopper generally identified as 22. Pallets 24, which may be wood or plastic, are moved by apparatus adapted to grasp and move pallets one-at-a-time and from the bottom of the stack. In this apparatus a cylinder 26 is adapted to move a vertical plate 28 so as to move forwardly (leftwardly) an array or stack of containers or pails 30. As depicted, these containers or pails are stacked three high and four wide but this may be more-or-less to suit the desired array of members to be palletized.

A plate 32 is attached to frame 20 and movable plate 28 is disposed immediately above said plate 32 so as to be advanced thereover. Plate 32 has a forward sloped edge 33 providing means for a smooth or relatively smooth transfer of the pails 30 to the left of the plate 32. The pallet 24 and the rows of stacked containers are moved by cylinder means 26 by a program control not shown and conventional. The pallet 24 shown is sufficiently advanced so that the grouping of containers against plate 28 is moved from plate 32 and onto the pallet. After transfer, the plate 28 is returned to the position shown. After the pallet 24 has been filled with the desired arrayed stacks of members the now filled pallet 24 is advanced on roller conveyor 34 for banding and disposal.

At the right angle to the frame 20 is an infeeding apparatus adapted to convey and "up-stack" the containers. Usually the containers 30 are bailed and filled by known apparatus not shown. An infeeding conveyor 36 is depicted as a plate type conveyor and terminates at a head pulley carried by shaft 37 in pillow blocks 38 mounted or secured in frame 40. Like strip conveyors 42 are carried by the same shaft and advance a container 30 toward the upstacking apparatus to be shown and described in subsequent FIGS. A hood or enclosure 44 is disposed to receive a container 30a as delivered by the pair of strip conveyors 42 and deliver the containers one-at-a-time to upstacking mechanism. As shown, there are three containers 30 moved by a cylinder 46 that is connected to a transfer member 48. This transfer member is shown as curved to receive and retain the cans 30 so as to provide support and guidance thereof during upstacking operations and during transfer. The movement of the transfer member 48 is usually full stroke so as to move the to-be-palletized containers to the near side. A stop 47 is positioned to limit the movement of the containers along and over plate 32.

EMBODIMENT OF FIG. 2

Figure 2:
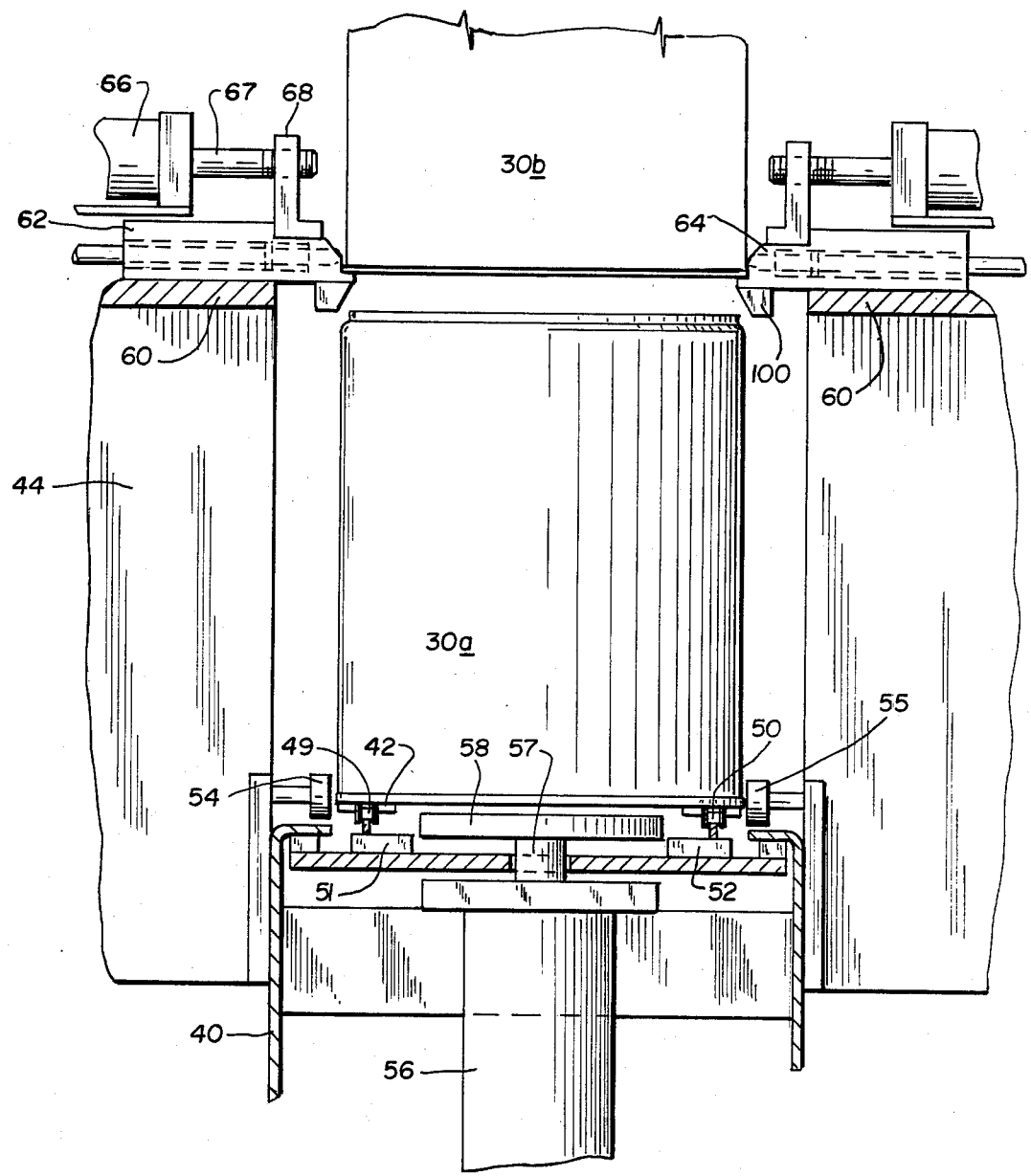
FIG. 2 represents an enlarged sectional view of a portion of the upstacking apparatus of this invention and showing partly diagrammatically and in an enlarged scale most of the essential components and their relationship one with another and the infed containers to be palletized.

FIG. 2 is a diagrammatic sectional view in greatly enlarged scale and showing the upstacker mechanism at a position just ahead of transfer member 48. This view depicts the portion of apparatus below the container 30 seen in FIG. 1. As shown, a container 30a is advanced to and into the upstacking position on strip conveyors 42 which have like roller chain members 49 and 50 carried by and on support plates 51 and 52. Side guides 54 and 55 guide the container 30a and are positioned and carried by support means secured to enclosure 44. A cylinder 56 has a piston rod 57 carrying a secured plate 58 by which container 30a is lifted. Frame 40 carries and positions cylinder 56 in the desired orientation.

Above the incoming container 30a is depicted a like container 30b of a like size and configuration. This differential in identification is for descriptive purposes as each of the containers is anticipated to be substantially alike. Carried by enclosure member 44 are opposed clamps carried by and guided by like support and platform members or brackets 60 more completely shown in later described FIGS. 3, 4 and 5. Clamp means shown in this FIG. 2 has reciprocated members 62 which carry pins 64. Each of these reciprocated members is moved by like cylinders 66. A piston rod 67 is secured to each L-shaped securing member 68. The reciprocated members 62 are moved in and out in a timed relationship by control apparatus not disclosed. The pins 64 engage the side extents of the container 30b when the reciprocated member is advanced. The jaw assembly is better illustrated in the enlarged views of FIGS. 3 and 4 to be described below.

EMBODIMENT OF FIGS. 3, 4, 5 AND 6

Figure 3:
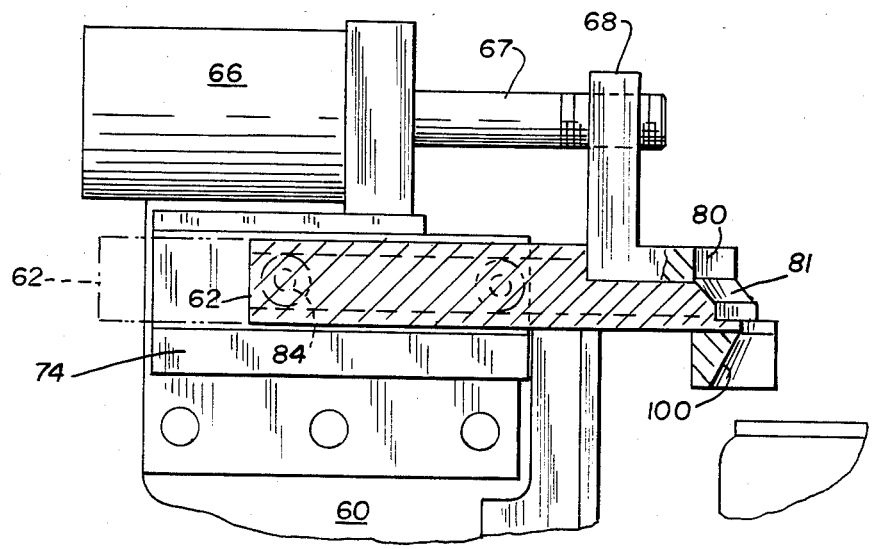
FIG. 3 represents a sectional side view, partly diagrammatic, and in a further enlarged scale, this view showing the clamp assembly and actuation means and particularly showing the movable clamp block assembly.
Figure 4:
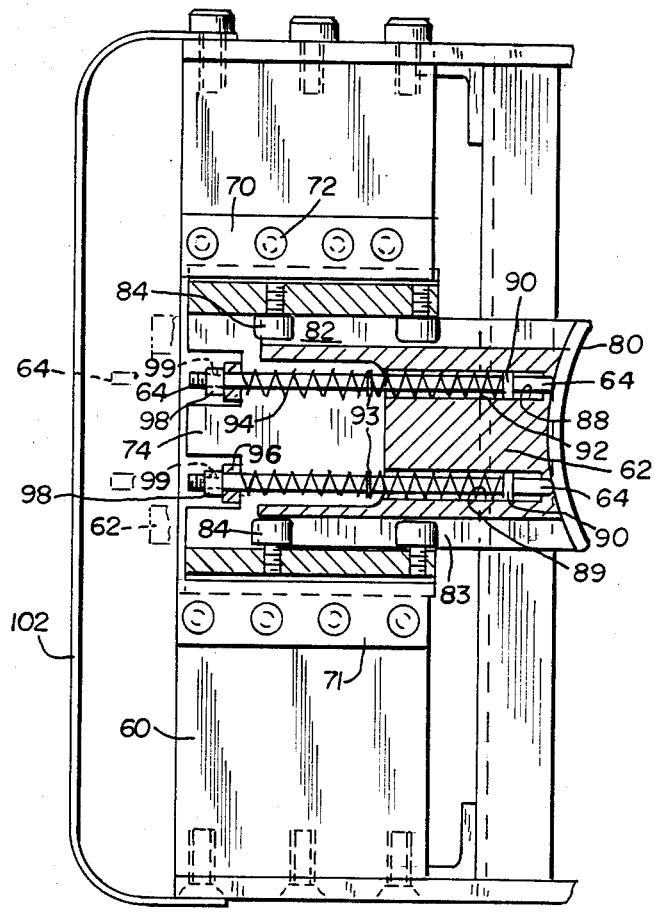
FIG. 4 represents a plan view of the clamp assembly, this view partly diagrammatic and particularly showing the pins and the spring bias therefor and the roller means by which the clamp block is carried so as to be moved in a closely controlled and reciprocated manner, this view taken on the lines 4—4 of FIG. 6 and looking in the direction of the arrows.
Figure 5:
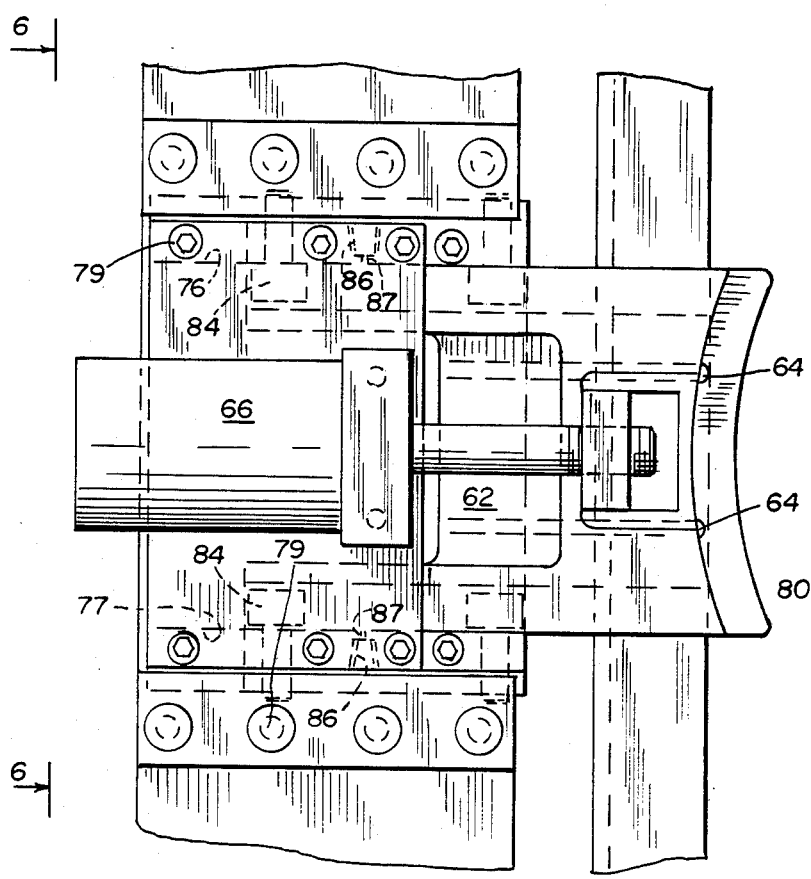
FIG. 5 represents the plan view of the clamp assembly as in FIG. 4 but showing the assembly in which the apparatus is viewed as taken on the line 5—5 of FIG. 6 and looking in the direction of the arrows.
Figure 6:
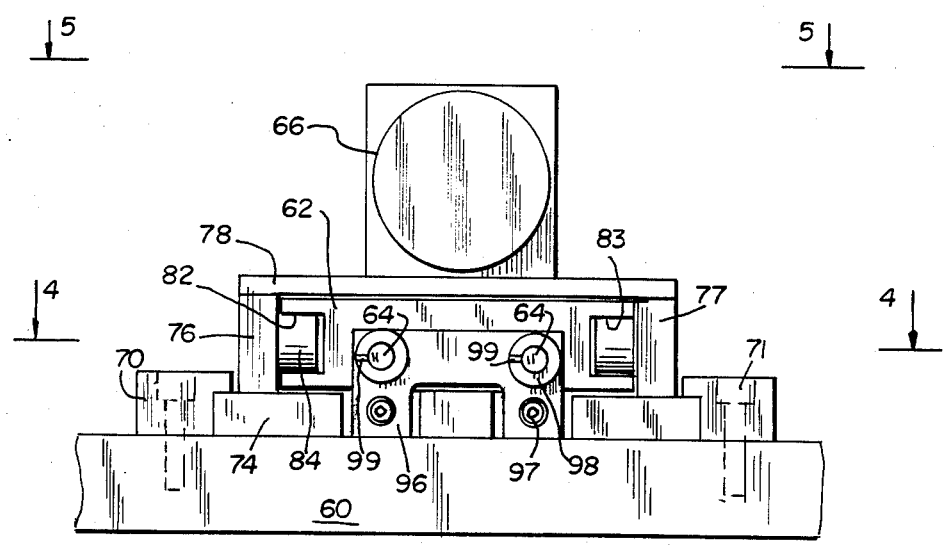
FIG. 6 represents an end view of the clamp assembly apparatus with this view partly diagrammatic and taken on the line 6—6 of FIG. 5 and looking in the direction of the arrows.

In FIGS. 3 through 6 is shown a jaw clamp assembly for round containers having sidewalls of metal or a substantially rigid equivalent. As depicted, in FIG. 3 the container 30 is shown with substantially regular sidewalls but the jaws and pins therein are designed to suit the manufacturer's design of the container. Each jaw assembly rests on support platform members 60. The upstacker jaw clamp assembly apparatus is provided with an adjusting capability and for this purpose retaining clamps 70 and 71 (as seen in FIG. 6) are secured by cap screws 72 (FIG. 4) to platform member 60. A contoured plate 74 is secured to member 60 by the tightening of these clamps. Referring again to FIG. 6, immediately inside clamps 70 and 71 are like side support plates 76 and 77 to which cover plate 78 provides the top member. As seen in FIG. 5, this cover plate is secured in place and at the same time side support plates 76 and 77 are secured by cap screws 79. Four socket headed cap screws are shown on each side in FIG. 5. Cylinder 66 is mounted on cover plate 78 by means of screws or the like that pass through holes in the header end in the conventional manner and enter threaded holes in cover plate 78 as shown in FIG. 3. Reciprocated member clamp block 62 is generally U-shaped and with its forward end contoured in an arcuate configuration to provide a support lip 80 adapted to accommodate the contour configuration and construction of the container 30 to be palletized. When the jaw is used with pins 64, block 62 is formed with a sloped guide surface 81 which provides a guide means for the container when and as lifted above the support in lip 80. It is contemplated that forward and back movement of the clamp jaw assembly is about two inches as provided by actuation of cylinder 66. Block 62 has finished grooves 82 and 83 disposed in each longitudinal extent or side of this block. In these grooves, which are reasonably precise and parallel, are disposed roller or anti-friction cam followers 84. Two followers are disposed to extend into each groove to support and retain the block so as to move in a very controlled path. It is to be noted that in FIG. 5 is shown formed into side support plate 76 and 77 a female pipe threaded passageway 86 and the end of this passageway is made with a wall into which a small aperture 87 is formed. This provides air passageway which allows a blast of air to enter the groove 82 or 83 to clean the groove from dirt and debris that may occur in the course of palletizing containers in a normal factory area.

Clamp block 62 is shown in FIG. 4 as having parallel or substantially parallel bores 88 and 89 in which pins 64 are carried. The front portion of this block is made with reduced diameters to provide a slide bearing for the pins 64. About an inch from the rounded and projecting ends of each of these pins are shoulder portions 90 which are sized to slide in the formed bores in the block. These portions 90 may be integral with the pins or may be mounted and secured to the pins to provide replacement because of wear. Immediately to the inner side of the shoulders 90 are springs which are compression springs. The assembly shown has a snap ring 93 secured in a groove formed midlength and in each of the pins. These snap rings provide stops for the rear of each spring 92. Another compression spring 94 is mounted on each pin 64 and provides additional bias for relative movement of the pins in the block 62. A contoured plate 96 is secured to plate 74 by cap screws 97.

Plate 96 is contoured to provide ear portions that establish rear stops for springs 94. Threaded on the rear of each pin on the threads formed thereon are stops 98 which are rotated to provide the desired forward projection of the pins 64 and then are secured in said desired position by set screws 99 carried in threaded apertures in the stops 98. This is best seen in FIGS. 4 and 6. It is to be noted that the forward support lip 80 of the reciprocated block 62 is contoured to provide a cam surface 100 to guide any errant upward ends of the containers 30 as they are upstacked. The clamp apparatus is conventionally provided with a formed sheet metal shield 102. The actuation of the reciprocated clamp apparatus is illustrated and described in conjunction with FIGS. 7, 8 and 9 hereinafter.

EMBODIMENTS OF FIGS. 7, 8 AND 9

Figure 7:
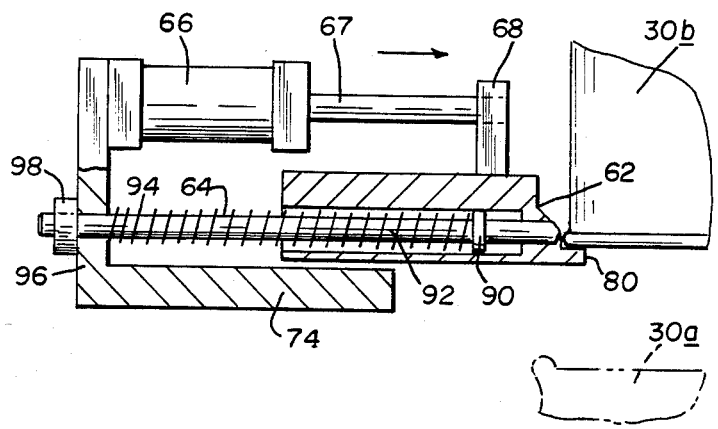
FIG. 7 represents a very diagrammatic side view of the clamp apparatus, this view made in a reduced scale and showing a round can or container in a supported condition as provided by the lip portion of the clamp.
Figure 8:
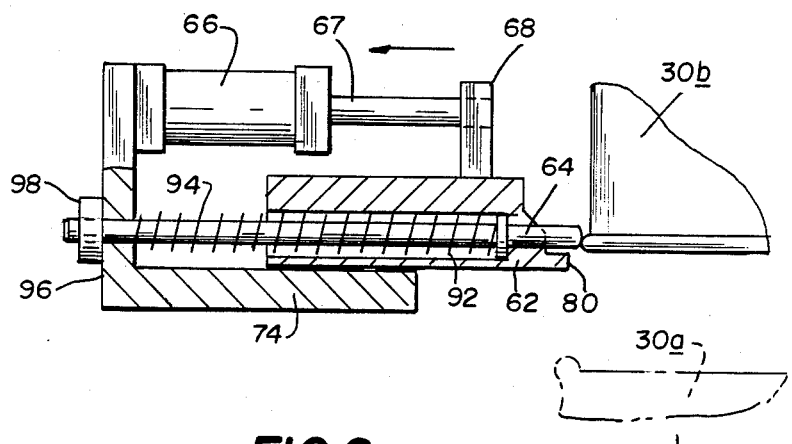
FIG. 8 represents the clamp apparatus shown in FIG. 7 but with the clamp apparatus moved sufficiently so that the supporting lip portion is withdrawn from the container but with the pins still in engagement with the container near or at its bottom.
Figure 9:
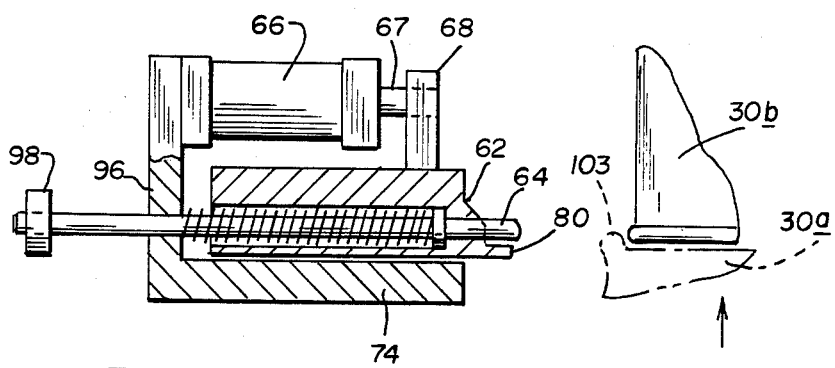
FIG. 9 represents the clamp apparatus shown in FIG. 7 but with the clamp apparatus now moved to the extreme away position and with the immediately below container moved upwardly to provide nesting and support for the above container or containers.

In FIGS. 7, 8 and 9 the clamp apparatus of this invention is depicted as in three modes of operation or situations. For the purposes of simplified description, the apparatus in these FIGS. are diagrammatically illustrated and with a drastic reduction in components. The FIGS. 3, 4, 5 and 6 show the several components of the clamp but reference is made to FIGS. 7, 8 and 9 for the purpose of describing the action.

In FIG. 7 the reciprocated jaw assembly has been moved into a gripping and supporting condition with container or pail 30b engaged at its lower bead end by block 62 as moved forwardly by cylinder 66. The lip 80 slides under and supports the bottom of this container. The advancement of the block 62 to the container causes pins 64 to move outwardly against the bias produced by springs 92 and 94.

In FIG. 8 the cylinder 66 has been actuated and has started to move the block 62 leftwardly. It is to be noted that block 62 has been moved leftwardly sufficiently for lip 80 to be withdrawn from supporting engagement of the container rim but pins 64 are still in engagement with the rim of the container 30b. In the meantime, the immediately below container or pail 30a is depicted as being moved upwardly by support plate 58 moved or lifted by cylinder 56 as seen in FIG. 2.

In FIG. 9 the cylinder 66 has moved block 62 leftwardly to the extreme contemplated limit. The pins 64 and supporting lip 80 are not presently in engagement with a container. Support of the container or pail 30b is absent while container or pail 30a is moved into the upstacked position and condition as depicted in FIGS. 2 and 9. This apparatus and motion procedure is used with pails of one gallon and up to five gallons and particularly when the containers are filled. It is to be noted that the pins 64 remove the probability and potential uneven withdrawal action of the jaws from the container support. It is also to be noted that in the embodiment of FIGS. 7, 8 and 9 the cylinder 66 is shown supported at its left end but this is a matter of selection.

It is to be noted in the step-by-step showing of FIGS. 7, 8 and 9 that container 30b and later on container 30a are supported by the extending lip portion 80 as shown in FIG. 7. This support lip extends under the container bottoms and is disposed to accept and bear the weight of the containers and contents. The individual containers may have as little as one gallon or as much as five gallons of paint or other liquid. In the palletizing of these containers as shown in FIG. 1, and with upstacking capability prior to this invention, the grasping and support means contemplated includes inclined spring-loaded and cam engaging fingers which operate in the manner of Chinese fingers. The use of such fingers and the withdrawing of these fingers from the sides of a container or box often is with a problem in that the release of the fingers from the container develops frictional overturning moments and misalignment may occur when the lower container is brought to the above container or containers.

In the reciprocated clamp apparatus of FIGS. 7, 8 and 9 the supporting lip 80 and the pins 64 engage the bottom rim or edge of the container 30. The reciprocated clamp assembly is disposed to work in pairs and in a timed relationship. It is to be noted that in FIG. 7 the container 30b is engaged by both the lip 80 and the pins 64. The container 30b is being lifted into position after delivery to the upstacker station.

In FIG. 8 the withdrawal motion of the clamp jaw apparatus has progressed to the extent that lip 80 is no longer beneath and supporting container 30b. The pins 64 in the opposed clamp assemblies engage the lower rim or edge of the container 30b so as to steady said container and maintain this container in the desired attitude and absent withdrawal frictional effect during the away movement of the clamp assembly. In FIG. 2 the upstacking apparatus is shown and in FIG. 8 the container 30a is being lifted by cylinder 56. Container 30b, although in a filled condition, does not appreciably drop during this withdrawal. The lifting of container 30a is timed to prevent unwanted dropping of the containers.

In FIG. 9 the container 30a is shown in supporting engagement with the lower end of container 30b. The containers 30a and 30b are now lifted into the desired position whereat 30a assumes the position of 30b as in FIG. 7. The reciprocated block 62 is in the process of being moved forwardly so the lip 80 moves under the container and pins 64 move into engagement of the bead or lower end of the container as in FIG. 7 whereat the cycle is repeated.

In the sequence depicted in FIGS. 7, 8 and 9 it is to be noted that gravity and the acceleration thereof is used to produce the desired sequence of movement of the containers. In FIG. 7 the jaws are closed against limiting means providing the extreme forward or closing motion of the reciprocated jaws 62 and the lip portions 80. These jaws support the elevated pail or container in a centered position. In FIG. 8 the jaw blocks 62 have started to be moved outwardly removing the lips 80 from support but with the pins 64 still in centering position and the pins still in contact with the pail or container. The pail or container is still in mid-air. In FIG. 9 the jaw blocks 62 and the spring-biased pins 64 have been moved to a full opened or non-supporting condition to allow the next or below pail or container 30a, as it is moved upwardly, to contact the bottom of pail or container 30b previously elevated. The inertia of the previously elevated pail or container 30b is used to permit pail or container 30a to provide support before pail or container 30b falls or moves downwardly any appreciable distance. It is to be noted that many manufacturers provide nesting rims or lips 103 on the covers which lips act as nesting and retention means. This cover design is a matter of design selection and has no patentable significance.

USE AND OPERATION AS IN EMBODIMENTS OF FIGS. 2 THROUGH 9

Figure 14:
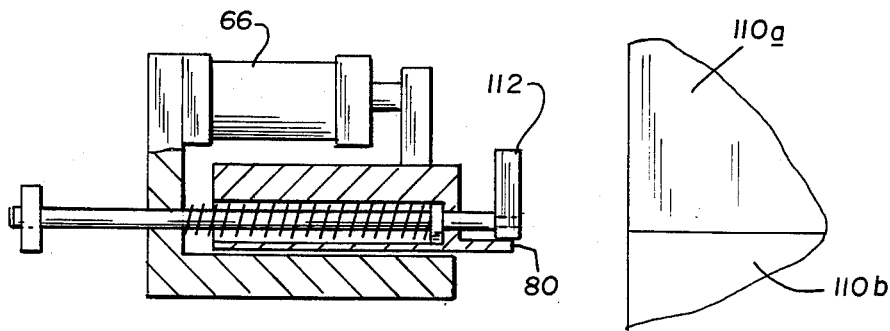
FIG. 14 represents a side view very similar to that depicted in FIG. 9 and with the side plate and clamp apparatus now moved from a grasping condition of the box-like container.
Figure 15:
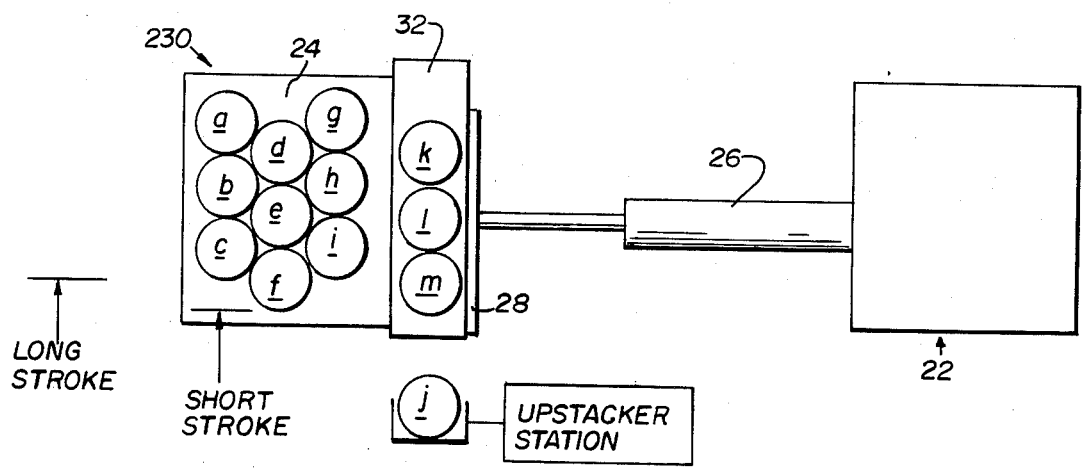
FIG. 15 represents a schematic plan view showing a loading procedure for a pallet.
Figure 16:
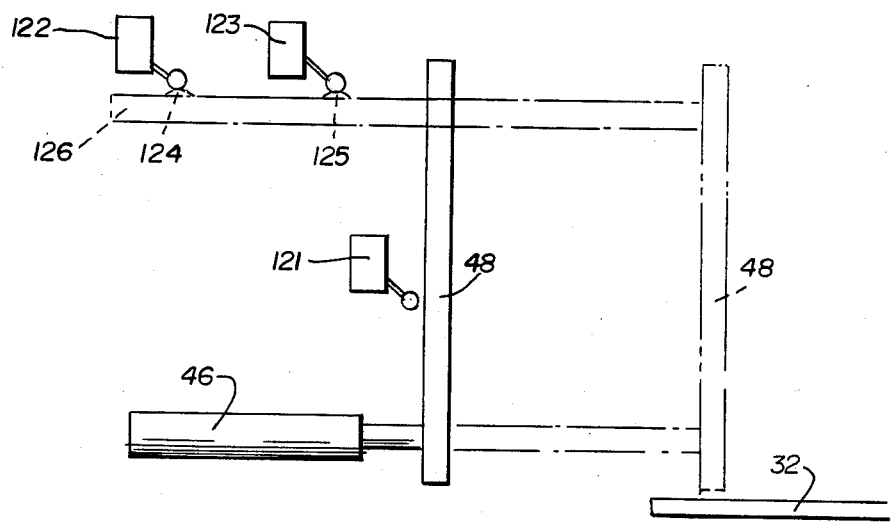
FIG. 16 represents a schematic view showing the switch placement for actuation of the stacking of the containers on a pallet.

The upstacker station of FIG. 2 is adapted to receive one container 30a on twin conveyor strands 42. Means is provided to cause the container 30a to be positioned between guides 54 and 55 and at the end of this infeed a stop is provided and a secured plate 58 is elevated. Timing of this motion is in response to a control circuit that reads this condition and sends a signal to actuate cylinder 56 to lift this container. This same control circuit also actuates cylinders 66 to move the clamp block members 62 inwardly. The lip 80 slides under the now upstacked container at the position whereat the container is at 30b. Guide cam surfaces 100 insure that the upstacked container, during the upward motion, is centrally positioned. The spring biased pins 64 engage the sides of the container and with this motion and counting by a logic circuit, not shown, is made to accommodate the particular container being advanced from other sources. The circuit is contemplated to be altered when and where necessary for the other embodiments of FIGS. 10 through 14. The circuit and switch arrangement used in and with the upstacking station is shown in FIGS. 15 and 16 described hereinafter.

EMBODIMENT OF FIGS. 10 AND 11

Figure 10:
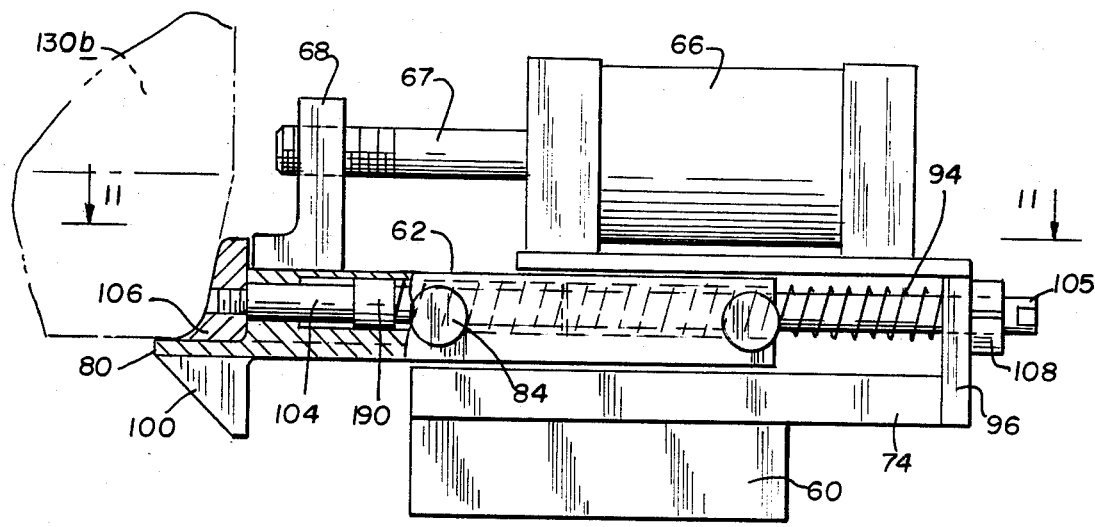
FIG. 10 represents a very diagrammatic side view of the clamp apparatus of FIGS. 3-6 and adapted for use with containers having a contoured bottom, said containers usually of molded plastic.
Figure 11:
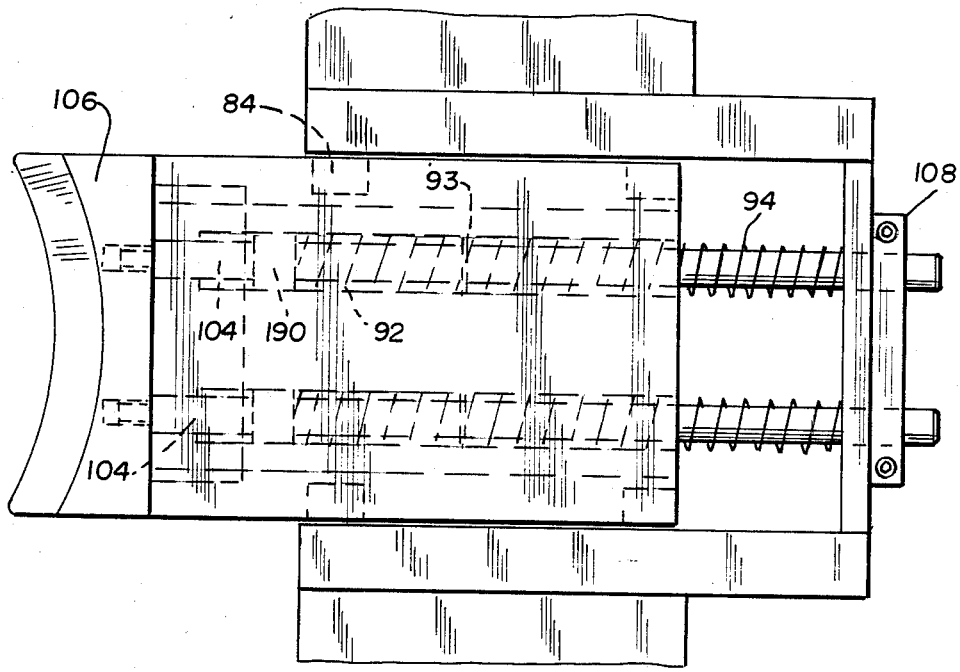
FIG. 11 represents a plan view of the apparatus of FIG. 10 and showing forward engaging lip means connected to and moved by the spring biased pins.

In FIGS. 10 and 11 the reciprocated clamp jaw assembly is altered so as to accept, for palletizing in the upstacker apparatus, containers which are of plastic or have a contoured bottom or otherwise cannot be processed by the apparatus of FIGS. 2 through 9. As depicted, a plastic pail or container 130b has a contoured bottom. This container may be of plastic wherein the pins 64 of FIGS. 2 through 9 may puncture or otherwise may damage the container 130b. In the embodiment of FIGS. 10 and 11, withstanding the concentrated pressure of the pins is accommodated by providing new pins and mating the contoured end of the container with an added filler member.

Movable block member 62 is furnished with said arcuate lip 80 as above described. This block 62 is provided with a downward portion on which a slope cam surface 100 is provided as above described. Cylinder 66 moves piston 67 and the attached L-shaped member 68 as above described. Rather than the spring-biased pins 64 this embodiment has pins 104 which have their front ends formed with threads and their rear end portions with a drive means 105. This rear end may be provided with a socket or screw driver slot or a square or hex formation as long as means to turn the pins 104 is provided. Rotation of these pins enables these pins to be mounted in threaded apertures in contoured receiving member 106. This receiving member is contoured to receive and mate with the contoured shape of the bottoms of the container or pail 130 and also to mate with and seat on the reciprocated block 62 so that the lip 80 extends as above described. As the contoured receiving member 106 is contemplated to be moved by the spring-biased pins 104 it is desired that these pins be secured by a yoke member 108 so that the pins be moved in concert and in a like extent. It may be desirable that pins 104 be provided with longer shoulder portions 190 which may or may not be a separately secured portion. This longer shoulder portion provides a greater sliding extent and support for pins 104. It is also contemplated that the shoulder portion 190 may be a replaceable member of oil-lite bronze or like material or plastic such as Teflon (TM DuPont). This reciprocated block is carried by rollers or cam followers 84 as above described.

The actuation of the embodiment of the clamp assembly of FIGS. 10 and 11 is very similar to the step-by-step showing of FIGS. 7, 8 and 9 above. Rather than individually activated pins 64, the yoked together pins 104 move receiving member 106 into engagement with the contoured end of the container 130b. It is to be noted that as the reciprocated block 62 is moved by cylinder 66 away from the container as described in conjunction with FIG. 7, the lip 80 is withdrawn (FIG. 8) while contoured member 106 remains in engagement with the container end until disengagement is desired as described in conjunction with FIG. 9. It is to be noted that the forward portions of the shoulder members 190 provide the stops for the pins 104 and in the withdrawal motion these steps cause the contoured member 106 to be moved away from the container 130. It is to be noted that except for the forming of pins 104, contoured member 106 and securing yoke 108 the members of the jaw clamp embodiment of FIGS. 10 and 11 are identical or very similar to the embodiment of FIGS. 3 through 6 above.

EMBODIMENT OF FIGS. 12, 13 AND 14

Figure 12:
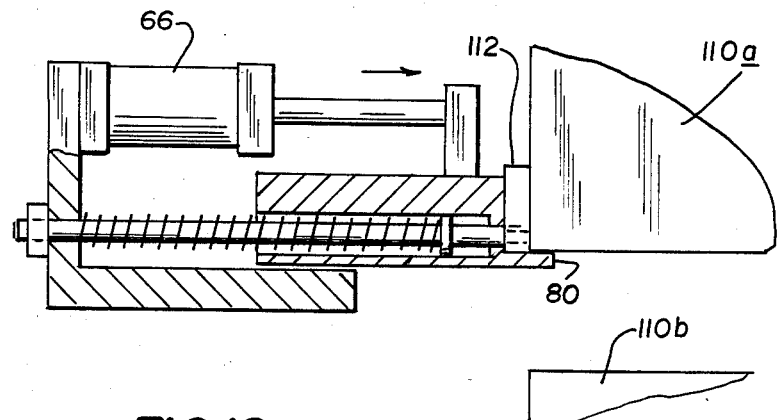
FIG. 12 represents a side view similar to that depicted in FIG. 7 but with the spring biased pins secured to and carrying a flat plate portion adapted to engage and grasp the bottom sides of a box-like container.
Figure 13:
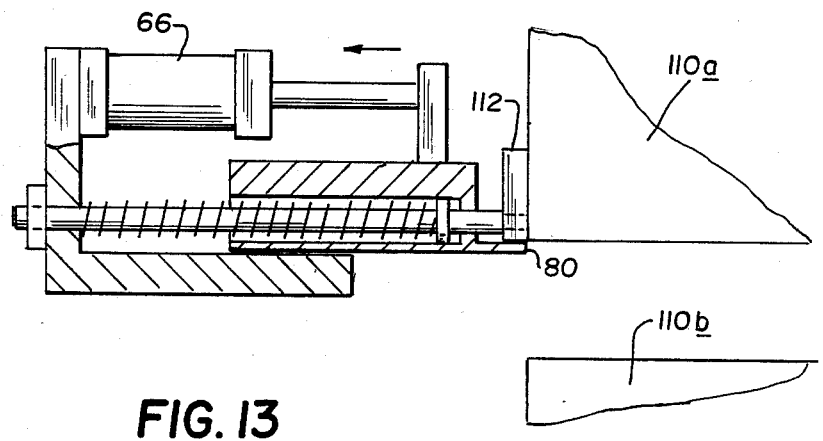
FIG. 13 represents a side view very similar to the showing of FIG. 8 and with a secured flat plate end portion as in FIG. 11.

It is to be noted that the jaw clamp member may be also altered to provide for palletizing boxes and the like. The containers, if boxes or box-like members, are contemplated to have flap portions already secured as by glue and the like. In the embodiment of FIGS. 12, 13 and 14 a step-by-step or progression is depicted and is much like FIGS. 7, 8 and 9 previously discussed. A box-like container 110 in FIG. 12 is shown in the supported and elevated condition as 110a and in the below condition as 110b. A secured plate member 112 is very similar to member 106 in that there are provided two threaded apertures adapted to receive and retain the threaded ends of spring-biased pins 104. These pins are secured in plate member 112 by rotation as above described and after securing are maintained in this position and condition by yoke 108 in the manner of FIGS. 10 and 11. Yoke 108 also provides the forward stop or limit of movement of plate member 112.

FIGS. 12, 13 and 14 are diagrammatic representations of the progressive steps of operation as in FIGS. 7, 8 and 9 above described. Cylinder 66 moves the L-shaped member 68 in a reciprocated manner. Container 110a is lifted by cylinder 56 as in FIG. 2. It is to be noted that lip member 80 supports the box 110a in FIG. 12 and the container is contemplated to be in a filled and sealed condition for palletizing and usually has substantial weight.

In the sequence of operations shown in FIGS. 12, 13 and 14 in FIG. 12 the box-like container is supported by lip 80 and the plate 112 is in close proximity to or is in engagement with the side walls of the container 112. As in the embodiment or step of FIG. 7 the jaws are in a closed condition and in the extreme forward position. Spring-biased plate 112 retains the container 110a in the centered position. In FIG. 13 the jaw blocks 62 have started to be moved away from the container and lips 80 are removed from a support condition. The pins 104 urge plate 112 into centering position and the plate is still in engagement with the container 110a while container 110b is being moved upwardly. In FIG. 14 the jaw blocks 62 and the spring biased pins 104 have been moved to the full open condition in which the jaws are nonsupporting. The outward movement of the jaws allows the next below box-like container 110b to be elevated and to engage the bottom surface of the next above box-like container. As above described, the inertia of the container previously elevated and gripped by the opposed jaw assemblies is used to permit the now elevated container to move into position to support the containers. Both box-like containers are elevated until the opposed jaws are again moved inwardly to the position and condition of FIG. 12.

CONTROL CIRCUIT AND OPERATION AS IN FIGS. 15 AND 16

In the palletizer apparatus of FIG. 1 there is depicted can or containers 30 arranged in a three-high and four side-by-side arrangement. The stacking of these containers is a matter of selection and any desired pattern can and may be provided. In the diagram of FIG. 15 the containers 30 are shown in intermesh array. For the purpose of description the forward row of three stacks is identified as 230a, b and c. The next and intermediate row which is in intermesh array is identified as stacks 230d, e and f. The third row is identified as 230g, h and i. The incoming container from the upstacker is identified as 230j. This upstacker feeds to the dead plate 32 and the stacks of containers thereon are identified as 230k, l and m. In operation, the upstacker accumulates the desired number of containers in a vertical stack 230j and with a long stroke of cylinder 26 which brings the stack moved by cylinder 46 and transfer member 48 to the position 230c. The cylinder 46 and member 48 are returned to accept the next stack of containers from the upstacker and when the desired number has been arranged in a vertical array this stack is moved as above and with and by the long stroke again pushes to stack from position j to c with the first c stack being displaced to position b. This action is repeated with the new stacked array moved from j to c with a long stroke and the first stack now moved to position a, the second stack to position b and the just moved stack occupying position c. Cylinder 26 and vertical plate 28 now move the container rows a, b and c from the dead plate 32 onto a below pallet 24.

The next row of containers is now accumulated. The upstacker apparatus accumulates the desired number of containers in a vertical array at position 230j but instead of a full stroke the cylinder 46 moves with a shortened stroke. The containers are moved to f on the dead plate. The accumulation and transfer or movement of the stack to the dead plate to form rows d, e and f utilizes this shortened stroke. The cylinder 26 and vertical plate 28 move the container rows from the dead plate to the pallet. With the rows 230a, b and c in place on the pallet the pushing of the rows 230d, e and f from the dead plate onto the pallet causes a nesting effect to be made and the sides of the containers are properly butted against each other and any small misalignment of one row to the next is compensated for in this transfer motion.

The upstacker again accumulates the desired number of containers and they are again moved onto the dead plate with the long stroke placing the containers in sequence as g, h and i where after they are moved from the dead plate onto the pallet and nest as shown.

The containers are alternately stacked with long and short stroke actions to produce the loading of the pallet as shown in FIG. 15. The number of rows is dependent upon the size of the pallet and size of the containers. This arrangement of containers is conventional for round containers such as cans of paint and the like.

In FIG. 16 there is diagrammatically shown means for controlling the stroke and length of the transfer motion. The control shown is for pneumatic circuit and includes switches 121, 122 and 123. Switch 121 is actuated by transfer member 48 and switches 122 and 123 are actuated in response to signals from cams 124 and 125 carried on a bar or member 126. In operation, cylinder 46 moves plate 48 back and forth and at its rear or out limit switch 121 is actuated. After a determined and counted actuation the upstacker indicates an accumulation of containers and when the desired number of containers is arranged a loading stroke is made from the station of the upstacker onto the dead plate.

In a long stroke positioning as in 230a, b and c and also in the row 230g, h and i the cylinder 46 essentially bottoms out when pushing the stack of containers from the upstacker station onto the dead plate 32. This stroke provides the desired position and location of the initial stack on the dead plate. This stroke is repeated for the filling of the dead plate with stacks of containers and a counting circuit, not shown, is employed for this loading of the dead plate. When the desired stacks are accumulated in a row the transfer plate 28 is moved to push the rows of containers to and onto an underneath pallet.

Assuming the nesting arrangement of FIG. 15 is to be followed cylinder 46 by means of cams 124 and 125 actuates switches 122 and 123. The stroke of the cylinder is reversed as to direction when the cylinder is still in actuation and before bottoming out and the forward motion is reversed to bring the plate 48 to its rear position. This actuation is repeated until the desired stacks of containers are placed on the dead plate to correspond to the positioning of 230d, e and f. These stacks of containers are now pushed from the dead plate onto the same pallet moved forwardly a desired amount. This transferred row may have a small amount of placement inaccuracy but this is not important as the nesting action described above occurs when this row of containers is pushed from the dead plate onto the pallet.

The sensing switches 121, 122 and 123 are located on the pusher assembly by which the stacks of containers are moved from the upstacker to the dead plate. Switch 121 senses the retracted position of the pusher 48 and feeds this information to the control circuit and also feeds this information to the counting circuit which determines the number of stacks to be accumulated before transfer from the dead plate onto the pallet.

Switch 122 is the long stroke control switch and is actuated by cam 124. This switch provides a signal to the counting circuit to control the number of stacks of containers pushed onto the dead plate 32. This circuit negates the short stroke switch 123 and is actuated by cam 125 when the circuit signal is set for a long stroke transfer. When the required number of stacks of containers (usually three or four) has been accumulated and moved onto the pallet the circuit is switched so that switch 123 and cam 125 are actuated and the switch 122 and cam 124 are deactivated.

The circuit now counts short strokes that are actuated to move stacks d, e and f or any desired number selected onto the dead plate. At the termination of this accumulation on the dead plate the stacks are pushed from the dead plate onto the pallet and the circuit is now reversed so that only long strokes are now employed. This reversal of stroke length is controlled by the logic circuit which controls not only the number of upstacked columns of containers that are pushed onto the dead plate but also controls the upstacker itself and the transfer of these containers from the dead plate onto the pallet and in the desired intermeshed sequence. It is to be noted that when the short stroke switch 123 is actuated it switches a logic circuit which shuts off the flow of pressurized air to cylinder 46 and directs this flow of pressurized air so as to move this cylinder in the opposite direction.

It is to be noted that the pallet 24 under the dead plate 32 is moved in a timed relationship to the transfer of containers. Whether containers 30, plastic containers 130 or boxes 110 are employed, the upstacking contemplates the use of spring-biased pin assemblies. This arrangement insures that the movement of lip 80 in the withdrawl motion described does not influence the centering of the container and also a possible overturning force in the withdrawal of the lip 80. The spring-biased engagement of the pins or pin actuated members and engagement with the sidewalls of the containers insures withdrawal of the lip portion 80 before release of the container and that the inertia of the drop of the container is employed during the upstacking procedure.

The jaw clamp of FIGS. 3 through 6 shows two pins 64 in each block 62 but this is not to preclude more pins or a bifurcated pin arrangement. What is important is that the pins center the container when and as the container is brought to the condition of FIGS. 7 and 8 and the withdrawal of the lip 80 does not affect the centering action of the pins. Bias for these pins is conventionally provided by like calibrated springs 92 and 94 but this does not preclude the use of bias means such as rubber-like material. The need for reasonable like bias at all positions of the movement of the pins is essential to insure accuracy in positioning. The pins 64 in FIGS. 3 through 6 are constructed so as to extend beyond the supporting lip 80. This lip extension is usually about one-quarter of an inch and the pins and opened lip about two to two and one-quarter inches apart for containers of about five gallons. The block 62 has its lip 80 about four inches wide for use with containers of about five gallon capacity. The lip 80 is about one-quarter of an inch deep. With smaller containers the clamp assemblies are reduced in proportion.

With the addition of a contoured receiving member 106 attached to the threaded ends of pins 104 the shape of the contoured bottom is considered. The lip 80 is made to extend beyond the contoured receiving member 106. As the member 106 is intended to be moved as a unit the pins 104 are yoked together. It is contemplated that member 106 may be carried by one reciprocable pin biased so as to be moved into centering position when and as the block 62 is moved from the supporting condition. The flat stop member 112 of FIGS. 12, 13 and 14 is like the contoured receiving member 106 in its support and actuation.

In all embodiments it is essential that in the withdrawal action of lip 80 from a supporting condition that the pins, contoured member or plate retain the container in a centered condition and position. The law of gravity is employed and the inertia is present during the initial period of time when and while that support of the container is not in position. The minimum fall of the container does not affect the positioning of the elevated container while the immediately below container is moved into a support condition. Elevation is continued until the jaw clamp assembly can again be moved inwardly as in FIG. 3 with the lip 80 in a supporting condition.

It is realized that the reciprocable jaw assembly may be made in configurations other than in FIGS. 1 through 16. In particular, the jaws on FIGS. 3 through 6 and FIGS. 10 and 11 contemplate two pins that are spring-biased forwardly. What is important is that with a container having substantial side members and with little or no bottom contour two rounded pin ends are preferred. This does not preclude a single forwardly-biased member with a bifurcated end adapted to engage a sidewall at two points or positions substantially equidistant and providing a centering action of the container. This forwardly biased member may be a single shank with a key or shaped countour to provide means preventing rotation of the shank portion. This shaped shank construction may be used for the embodiments provided in palletizing containers as in FIG. 10 and boxes as in FIG. 12. What is important and novel is providing forwardly-biased and independently reciprocable movable pins or members that engage the sides of the container while the supporting lip 80 is withdrawn from supporting condition and position.

Terms such as "left", "right", "up", "down", "bottom", "top", "front", "back", "in", "out" and the like are applicable to the embodiments shown and described in conjunction with the drawings. These terms are merely for the purposes of describing the upstacker and opposed jaw clamps with independently moved pin members.

While particular embodiments of the clamp assemblies have been shown and described it is to be understood the invention is not limited thereto and protection is sought to the broadest extent the prior art allows.

What is claimed is:

1. An upstacker jaw clamp in which containers of like or similar size and configuration are fed one at a time to an upstacker station and to and on an elevating platform which receives and lifts said containers to an elevated condition whereat the container is retained by opposed reciprocated jaw clamps moved simultaneously or nearly simultaneously into a retaining condition in response to signals from a logic and timing control circuit, this upstacker and clamp jaws are actuated to deliver said containers to a palletizing apparatus including a pallet moved from a storage means and, one at a time, presented in way of a loading station, said containers moved by cylinder means in response to signal actuation provided by said logic and timing control circuit, this apparatus and clamp jaw including:

(a) means for advancing a like container to the upstacking station in response to a timing signal means from said control circuit and at said upstacking station actuating an elevating platform which receives and elevates this container to a position from which said containers are moved;

(b) a pair of jaw clamps in which each clamp has a reciprocable block that includes a supporting lip portion disposed toward the container and disposed towards each other and in the same plane and when the jaw clamp blocks are moved toward each other the lip portions thereof are movable under the lower rim of the just elevated container to support said container when brought to its upper limit by said elevating platform;

(c) means for moving the clamp blocks in a reciprocated manner and in a timed relationship with the elevated motion of the upstacker elevating platform, the upward motion concluding with an extreme upward limit of said platform;

(d) a pair of pins carried in each of said clamp blocks, said pins disposed and reciprocable in substantially parallel bores in said block with each pin having means for limiting the forward movement of the pin, each pin having a blunted end and with the axis of said pins disposed substantially equidistant from a theoretical line that passes through the center of the blocks and the center of the container, each pin urged forwardly towards the container by bias means, the pair of pins in each block adapted to extend forwardly of the supporting lip when a container is not supported by this lip, the pins extending toward each other and toward the sidewall of the container with the bias force urging a pin forwardly causing the blunt ends of the pins to engage the sidewalls of said container when the jaw block is moved into close proximity of said container, these pins when moved into engagement with the sidewalls of the container providing a centering action particularly during the withdrawal of the lip of the jaw clamp away from supporting condition of the container and further withdrawal of the jaw clamp block and these reciprocable pins carried therein and extending from said block being sufficiently moved away from the container so as to enable a below container to be elevated to a supporting condition whereat the jaw clamp block, pins and said lip portion are brought to a supporting position at and below the end of the just elevated below container;

(e) fixed means for supporting the jaw clamps so as to be reciprocated toward and from a container;

(f) means for repeating the upstacking sequence of the containers until the desired number of containers is accumulated in a substantially vertically stacked array;

(g) means for moving the accumulated stack of containers from the upstacking station to and onto a dead plate and repeating this operation by and with a timed control until a predetermined number of stacks of containers are positioned side by side on said dead plate, and (h) means for moving a row of containers from said dead plate onto a pallet positioned below the dead plate.

2. An upstacker jaw clamp as in claim 1 in which the blunt end of the pins in each reciprocated block is rounded and at the other end is provided with stop means and the bias urging the pins toward the forward end are compression springs adapted to provide a like bias during the limits of movement.

3. An upstacker jaw clamp as in claim 2 in which the pins are carried in like bores formed in the block with that portion of the bores at the lip end sized to slidably retain said pins and with the forward end portion of these pins having a shoulder sized to provide a slidable support for the pins and a stop shoulder for the compression springs and with this stop shoulder larger than the forward bore portion.

4. An upstacker jaw clamp as in claim 1 in which the reciprocable block at the lip portion is additionally provided with a downwardly and rearwardly directed guide slope by which the elevated container is urged inwardly and centered by the jaw clamp block after the container has been lifted to and above the lip portion.

5. An upstacker jaw clamp as in claim 4 in which the reciprocable block at its upper lip portion is provided with a down and forwardly directed cam guide means adapted to center and position a container as it is lifted above said lip by the reciprocated elevating platform.

6. An upstacker jaw clamp as in claim 1 in which the reciprocable block is formed with grooves at and along each longitudinal side and each block is supported at and along each longitudinal side by a pair of anti-friction rollers or bearings that are supported by fixed means while rollers as pairs extend into one of said grooves to retain the block in an established plane of movement.

7. An upstacker jaw clamp as in claim 6 in which there is provided an air blast means extending into the groove with an applied air blast removing dirt and/or debris from the groove.

8. An upstacker jaw clamp as in claim 1 in which the reciprocable motion imparted to the block is provided by a pneumatic cylinder.

9. An upstacker jaw clamp as in claim 8 in which the pneumatic cylinder is carried in a fixed position above the reciprocated clamp block, said cylinder having a forwardly extending piston rod and with a connection from said piston rod to said block, the reciprocation movement provided by this cylinder being in response to signals provided by the timed actuation of a valve controlling the movement of the palletizer.

10. An upstacker jaw clamp as in claim 1 in which the bias of each pin is provided by a compression spring and the rear ends of said springs are engaged by fixed means carried by the fixed support of the block.

11. An upstacker jaw clamp in which containers of like or similar size and configuration are fed one at a time to an upstacker station and to and on an elevating platform which receives and lifts said containers to an elevated condition whereat the container is retained by opposed reciprocated jaw clamps moved simultaneously or nearly simultaneously into a retaining condition in response to signals from a logic and timing control circuit, this upstacker and clamp jaws are actuated to deliver said containers to a palletizing apparatus including a pallet moved from a storage means and, one at a time, presented in way of a loading station, said containers moved by cylinder means in response to signal actuation provided by said logic and timing control circuit, this apparatus and clamp jaw including:

(a) means for advancing a like container to the upstacking station in response to a timing signal means from said control circuit and at said upstacking station actuating an elevating platform which receives and elevates this container to a position from which said containers are moved;

(b) a pair of jaw clamps in which each clamp has a reciprocable block that includes a supporting lip portion disposed toward the container and disposed towards each other and in the same plane and when the jaw clamp blocks are moved toward each other the lip portions thereof are movable under the lower rim of the just elevated container to support said container when brought to its upper limit by said elevating platform;

(c) means for moving the clamp blocks in a reciprocated manner and in a timed relationship with the elevated motion of the upstacker elevating platform, the upward motion concluding with an extreme upward limit of said platform;

(d) a pair of pins carried in each of said clamp blocks, said pins disposed and reciprocable in substantially parallel bores in said block with each pin having means for limiting the forward movement of the pin, each pin having a forward end formed with a thread and with the axis of said pins disposed substantially equidistant from a theoretical line that passes through the center of the blocks and the center of the container, each pin urged forwardly towards the container by bias means, the pair of pins in each block adapted to extend forwardly by bias means, the threaded end of the pins in each block extending forwardly for mounting in threaded apertures in an attached contour portion, this reciprocable block formed with an L-shaped lip providing an above recess and in this recess and above said lip this attached contoured portion is movable in and out so as to engage a contoured end and side wall of the container, said attached contoured portion movable into engagement with the side wall of the container by the bias imparted to these pins and remaining in engagement with the side wall of said container to provide a centering action particularly during withdrawal of the lip of the jaw clamp away from supporting condition of the container with further withdrawal of the clamp block and the contoured portion carried above and extending beyond the lip so that the jaw clamp block and contoured portion are sufficiently moved away from the container to enable a below container to be elevated to a supporting condition whereat the jaw clamp block, contoured portion and said lip portion are brought to a supporting position at and below the end of the just elevated below container;
(e) fixed means for supporting the jaw clamps so as to be reciprocated toward and from a container;
(f) means for repeating the upstacking sequence of the containers until the desired number of containers are accumulated in a substantially vertically stacked array;
(g) means for moving the accumulated stack of containers from the upstacking station to and onto a dead plate and repeating this operation by and with a timed control until a predetermined number of stacks of containers are positioned side by side on said dead plate, and
(h) means for moving a row of containers from dead plate onto a pallet positioned below the dead plate.

12. An upstacker jaw clamp as in claim 11 in which the threaded ends of the pins when engaged in the threaded apertures of the contour portion are reciprocably mounted in the bores in the block and extend to the rear of the block sufficiently so as to expose and provide means for engaging the pins so as to rotate these pins, this means for engaging and turning said pins including flats, squares and/or socket portions.

13. An upstacker jaw clamp as in claim 12 in which the pins are yoked together at their rear ends to insure that these pins move in concert to provide the same extent and rate of movement of the pin secured contoured portion.

14. An upstacker jaw clamp as in claim 12 in which the rear end of the pins in each reciprocated block is provided with stop means and the bias urging the pins toward the forward end are compression springs adapted to provide a like bias during the limits of movement.

15. An upstacker jaw clamp as in claim 14 in which the pins are carried in like bores formed in the block with that portion of the bores at the lip end sized to slideably retain said pins and with the forward end portion of these pins having a shoulder sized to provide a slideable support for the pins and a stop shoulder for the compression springs and with this stop shoulder larger than the forward bore portion.

16. An upstacker jaw clamp as in claim 14 in which the bias of each pin is provided by a compression spring and the rear ends of said springs are engaged by fixed means carried by the fixed support of the block.

17. An upstacker jaw clamp in which containers of like or similar size and configuration are fed one at a time to an upstacker station and to and on an elevating platform which receives and lifts said containers to an elevated condition whereat the container is retained by opposed reciprocated jaw clamps moved simultaneously or nearly simultaneously into a retaining condition in response to signals from a logic and timing control circuit, this upstacker and clamp jaws are actuated to deliver said containers to a palletizing apparatus including a pallet moved from a storage means and, one at a time, presented in way of a loading station, said containers moved by cylinder means in response to signal actuation provided by said logic and timing control circuit, this apparatus and clamp jaw including:

(a) means for advancing a like container to the upstacking station in response to a timing signal means from said control circuit and at said upstacking station actuating an elevating platform which receives and elevates this container to a position from which said containers are moved;
(b) a pair of jaw clamps in which each clamp has a reciprocable block that includes a supporting lip portion disposed toward the container and disposed towards each other and in the same plane and when the jaw clamp blocks are moved toward each other the lip portions thereof are movable under the lower rim of the just elevated container to support said container when brought to its upper limit by said elevating platform;
(c) means for moving the clamp blocks in a reciprocated manner and in a timed relationship with the elevated motion of the upstacker elevating platform, the upward motion concluding with an extreme upward limit of said platform; (d) a pair of pins carried in each of said clamp blocks, said pins disposed and reciprocable in substantially parallel bores in said block with each pin having means for limiting the forward movement of the pin, each pin having a forward end formed with a thread and with the axis of said pins disposed substantially equidistant from a theoretical line that passes through the center of the blocks and the center of the container, each pin urged forwardly towards the container by bias means, the threaded ends of the pins in each block extending forwardly for mounting in an attached plate portion, this reciprocable block formed with an L-shaped lip and an above recess and in this recess and above said lip this attached plate portion is movable in and out so as to engage a side wall of a box-like container, the attached plate portion movable into engagement with the side wall by the bias imparted to these pins and remaining in engagement with the side wall of said box-like container to provide a centering action particularly during withdrawal of the lip of the jaw clamp away from supporting condition of the container and further withdrawal of the clamp block and the plate portion as carried above and extending beyond the lip so that the jaw clamp block and plate portion are sufficiently moved away from the box-like container to enable a below container to be elevated to a supporting condition whereat the jaw clamp block, plate portion and said lip portion are brought to a supporting position at and below the end of the just elevated container;
(e) fixed means for supporting the jaw clamps so as to be reciprocated toward and from a container;
(f) means for repeating the upstacker sequence of the containers until the desired number of containers is accumulated in a substantially vertically stacked array;
(g) means for moving the accumulated stack of containers from the upstacking station to and onto a dead plate and repeating this operation by and with a timed control until a predetermined number of stacks of containers are positioned side by side on said plate;
(h) means for moving a row of containers from said dead plate onto a pallet positioned below the dead plate.

18. An upstacker jaw clamp as in claim 17 in which the threaded ends of the pins when engaged in the threaded apertures of the plate portion are reciprocably mounted in the bores in the block and extend to the rear of the block sufficiently so as to expose and provide means for engaging the pins so as to rotate these pins, this means for engaging and turning said pins including flats, squares and/or socket portions.

19. An upstacker jaw clamp as in claim 18 in which the reciprocable block is formed with grooves at and along each longitudinal side and each block is supported at and along each longitudinal side by a pair of anti-friction rollers or bearings that are supported by fixed means while rollers as pairs extend into one of said grooves to retain the block in an established plane of movement.

20. An upstacker jaw clamp as in claim 19 in which the pins are carried in like bores formed in the block with that portion of the bores at the lip end sized to slideably retain said pins and with the forward end portion of these pins having a shoulder sized to provide a slideable support for the pins and a stop shoulder for the compression springs and with this stop shoulder larger than the forward bore portion.

21. An upstacker jaw clamp as in claim 20 in which the reciprocable block at the lip portion is additionally provided with a downwardly and rearwardly directed guide slope by which the elevated container is urged inwardly and centered by the jaw clamp block after the container has been lifted to and above the lip portion.

22. An upstacker jaw clamp as in claim 21 in which the bias of each pin is provided by a compression spring and the rear ends of said springs are engaged by fixed means carried by the fixed support of the block.

23. An upstacker jaw clamp in which containers of like or similar size and configuration are fed one at a time to an upstacker station and to and on an elevating platform which receives and lifts said containers to an elevated condition whereat the container is retained by opposed reciprocated jaw clamps moved simultaneously or nearly simultaneously into a retaining condition in response to signals from a logic and timing control circuit, this upstacker and clamp jaws are actuated to deliver said containers to a palletizing apparatus including a pallet moved from a storage means and, one at a time, presented in way of a loading station, said containers moved by cylinder means in response to signal actuation provided by said logic and timing control circuit, this apparatus and clamp jaw including:

(a) means for advancing a like container to the upstacking station in response to a timing signal means from said control circuit and at said upstacking station actuating an elevating platform which receives and elevates this container to a position from which said containers are moved;

(b) a pair of jaw clamps in which each clamp has a reciprocable block that includes a supporting lip portion disposed toward the container and disposed towards each other and in the same plane and when the jaw clamp blocks are moved toward each other the lip portions thereof are movable under the lower rim of the just elevated container to support said container when brought to its upper limit by said elevating platform;

(c) means for moving the clamp blocks in a reciprocated manner and in a timed relationship with the elevated motion of the upstacker elevating platform, the upward motion concluding with an extreme upward limit of said platform;

(d) a pair of pins carried in each of said clamp blocks, said pins disposed and reciprocable in substantially parallel bores in said block with each pin having means for limiting the forward movement of the pin, each pin having a blunted end and with the axis of said pins disposed substantially equidistant from a theoretical line that passes through the center of the blocks and the center of the container, each pin urged forwardly towards the container by bias means, the pair of pins in each block adapted to extend forwardly of the supporting lip when a container is not supported by this lip, the pins extending toward each other and toward the sidewall of the container with the bias force urging a pin forwardly causing the blunt ends of the pins to engage the sidewalls of said container when the jaw block is moved into close proximity of said container, these pins when moved into engagement with the sidewalls of the container providing a centering action particularly during the withdrawal of the lip of the jaw clamp away from supporting condition of the container and further withdrawal of the jaw clamp block and these reciprocable pins carried therein and extending from said block being sufficiently moved away from the container so as to enable a below container to be elevated to a supporting condition whereat the jaw clamp block, pins and said lip portion are brought to a supporting position at and below the end of the just elevated below container;

(e) fixed means for supporting the jaw clamps so as to be reciprocated toward and from a container;

(f) means for repeating the upstacking sequence of the containers until the desired number of containers is accumulated in a substantially vertically stacked array;

(g) plate member means for moving the accumulated stack of containers from the upstacking station to and onto a dead plate and repeating this operation by and with a timed control until a predetermined number of stacks of containers are positioned side by side on said dead plate;

(h) means for moving a row of containers from said dead plate onto a pallet positioned below the dead plate, and (i) switch means actuated by the plate member used for moving the stack of containers from the upstacker station to the dead plate and carried by this plate member is a cam member adapted to engage two additional switch means which additional switch means are controlled to provide long and shorter strokes, said switch means sending counting signals to means which establish the number of containers in a stack and number of stacks on a dead plate, the stroke lengths being alternated between rows of containers to provide intermeshing when the containers are cylindrical or nearly cylindrical.

24. An upstacker jaw clamp in which containers of like or similar size and configuration are fed one at a time to an upstacker station and to and on an elevating platform which receives and lifts said containers to an elevated condition whereat the container is retained by opposed reciprocated jaw clamps moved simultaneously or nearly simultaneously into a retaining condition in response to signals from a logic and timing control circuit, this upstacker and clamp jaws are actuated to deliver said containers to a palletizing apparatus including a pallet moved from a storage means and, one at a time, presented in way of a loading staion, said containers moved by cylinder means in response to signal acutation provided by said logic and timing control circuit, this apparatus and clamp jaw including:

(a) means for advancing a like container to the upstacking station in response to a timing signal means from said control circuit and at said upstacking station actuating an elevating platform which receives and elevates this container to a position from which said containers are moved;

(b) a pair of jaw clamps in which each clamp has a reciprocable block that includes a supporting lip portion disposed toward the container and disposed towards each other and in the same plane and when the jaw clamp blocks are moved toward each other the lip portions thereof are movable under the lower rim of the just elevated container to support said container when brought to its upper limit by said elevating platform;

(c) means for moving the clamp blocks in a reciprocated manner and in a timed relationship with the elevated motion of the upstacker elevating platform, the upward motion concluding with an extreme upward limit of said platform;

(d) a pin means carried in each of said clamp blocks and reciprocable in and non-rotatable in said block with said pin means having prescribed limits of the forward movement, said pin means urged forwardly towards the container by bias means the end of the pin means in each block adapted to extend forwardly of the supporting lip when a container is not supported by this lip, the extending end of each pin means disposed toward each other and toward the side wall of the container with the bias force urging said pin means forwardly causing the pin means to engage the side walls of said container when the jaw block is moved into close proximity of said container, these pin means when moved into engagement with the side walls of the container providing a centering action particularly during the withdrawal of the lip of the jaw clamp away from supporting condition of the container and further withdrawal of the jaw clamp block and these reciprocable pin means carried therein and extending from said block being sufficiently moved away from the container so as to enable a below container to be elevated to a supporting condition whereat the jaw clamp block, pin means and said lip portion are brought to a supporting position at and below the end of the just elevated below container;

(e) fixed means for supporting the jaw clamps so as to be reciprocated toward and from a container;

(f) means for repeating the upstacking sequence of the containers until the desired number of containers is accumulated in a substantially vertically stacked array;

(g) means for moving the accumulated stack of containers from the upstacking station to and onto a dead plate and repeating this operation by and with a timed control until a predetermined number of stacks of containers are positioned side by side on said dead plate, and (h) means for moving a row of containers from said dead plate onto a pallet positioned below the dead plate.

25. An upstacker jaw clamp as in claim 24 in which the pin means is made with at least two projecting blunted pin ends disposed so as to be substantially equidistant from a theoretical line passing through the center of the container and center of the reciprocable blocks.

26. An upstacker jaw clamp as in claim 24 in which the pin means is secured to and moves a contoured portion positioned above said lip, this contoured portion disposed to engage a like contoured end and sidewall of a container.

27. An upstacker jaw clamp as in claim 24 in which the pin means is secured to and moves a plate-like member positioned above said lip portion, this plate-like member disposed to engage the sidewall of a box-like container.

* * * * *